United States Patent [19]
Aoki et al.

[11] Patent Number: 5,961,290
[45] Date of Patent: Oct. 5, 1999

[54] HELICOPTER BLADE AEROFOIL

[75] Inventors: Makoto Aoki; Hiroki Nishimura; Eiichi Yamakawa, all of Kakamigahara, Japan

[73] Assignee: Advanced Technology Institute Of Commuter-Helicopter, LTD., Kakamigahara, Japan

[21] Appl. No.: 09/023,699

[22] Filed: Feb. 13, 1998

[30] Foreign Application Priority Data

Feb. 14, 1997 [JP] Japan ...................................... 9-030730

[51] Int. Cl.$^6$ ...................................................... B63H 1/26
[52] U.S. Cl. ...................... 416/223 R; 416/238; 416/243; 416/DIG. 2; 416/DIG. 5
[58] Field of Search ................................ 415/223 R, 238, 415/243, DIG. 2, DIG. 5

[56] References Cited

U.S. PATENT DOCUMENTS

| | | |
|---|---|---|
| 4,314,795 | 2/1982 | Dadone . |
| 4,459,083 | 7/1984 | Bingham .............................. 416/223 R |
| 4,744,728 | 5/1988 | Lednicer et al. . |
| 5,344,102 | 9/1994 | Nakadate et al. ..................... 244/35 R |

FOREIGN PATENT DOCUMENTS

| | | |
|---|---|---|
| 50-102099 | 8/1975 | Japan . |
| 59-134096 | 8/1984 | Japan . |
| 62-34600 | 7/1987 | Japan . |
| 63-64894 | 3/1988 | Japan . |

*Primary Examiner*—F. Daniel Lopez
*Assistant Examiner*—Ninh Nguyen
*Attorney, Agent, or Firm*—Wenderoth, Lind & Ponack, LLP

[57] ABSTRACT

The coordinates defining the upper surface, lower surface, leading edge configuration and center of circle for a helicopter blade airfoil are given to increase maximum lift coefficient and lift-to-drag ratio, and to reduce noise level.

4 Claims, 7 Drawing Sheets

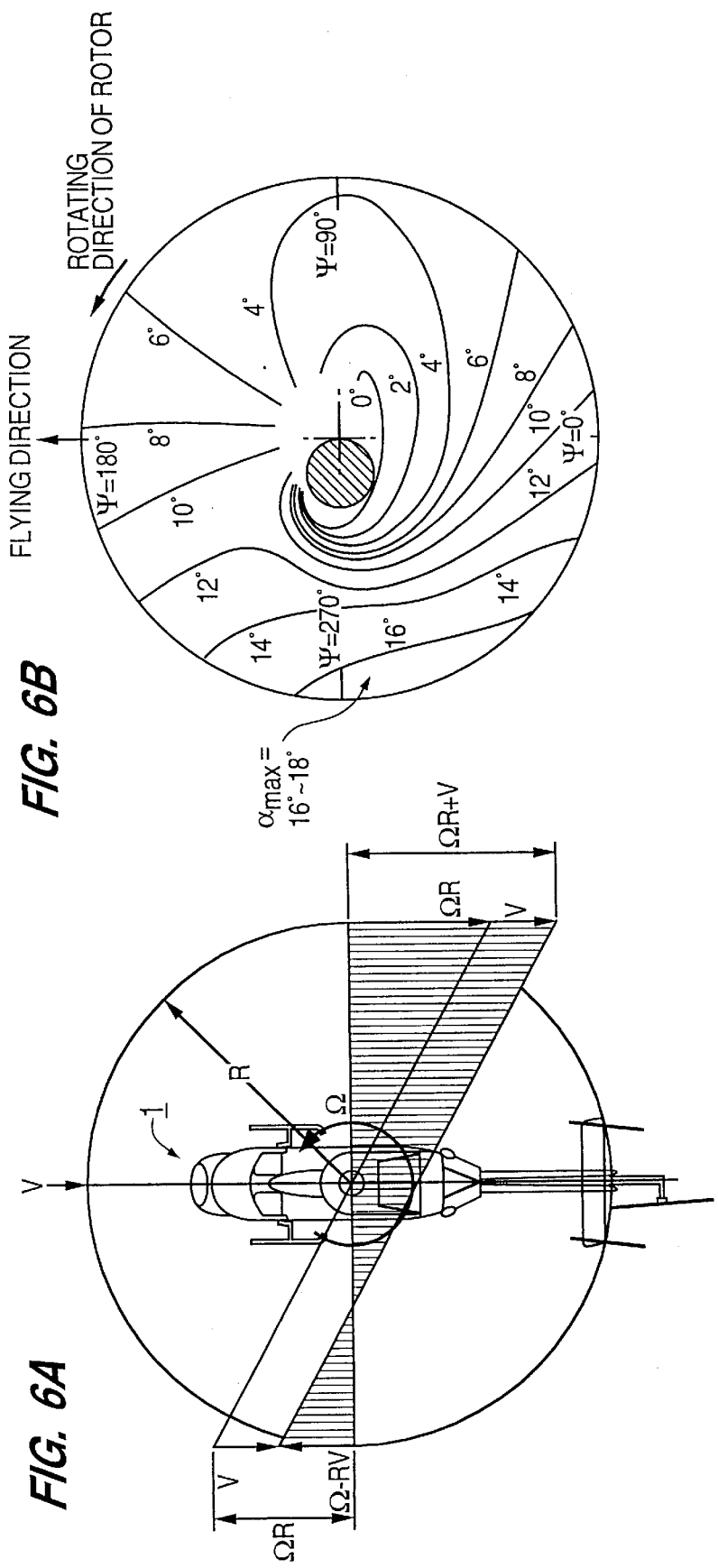

HELICOPTER BLADE AEROFOIL

BACKGROUND OF THE INVENTION

1. Field of the Invention

The present invention relates to a helicopter blade aerofoil.

2. Description of the Related Art

FIGS. 6A and 6B are illustrative views for showing aerodynamic characteristics of a rotor of a helicopter in forward flight. As shown in FIG. 6A, when a helicopter 1 with a rotor having a radius R which is rotating at a rotational angular velocity $\Omega$ advances at a ground velocity V, the airspeeds of an advancing blade where the rotational speed of the rotor is added to the ground velocity V and a retreating blade where the ground velocity V is subtracted from the rotational speed of the rotor are significantly different.

In particular, at a position of an azimuth angle $\Psi$ (angle measured counterclockwise from the rearward direction of the helicopter 1) of 90°, the airspeed of the advancing blade reaches a maximum and the airspeed of a tip of the advancing blade becomes $\Omega \times R + V$. At a position of $\Psi=270°$, on the other hand, the airspeed of the retreating blade reaches a minimum and the airspeed of a tip of the retreating blade becomes $\Omega \times R - V$. The airspeed of an intermediate portion of the blade takes a value obtained by proportional distribution of $\Omega \times R + V$ and $\Omega \times R - V$. For example, when $\Omega \times R = 795$ km/h and $V = 278$ km/h are assumed, the airspeed at a position of about 35% from the root end of the retreating blade becomes zero, as shown in FIG. 6A.

Since the airspeeds of the blades thus vary greatly while the blades make one revolution, various phenomena take place. On an advancing blade, drag coefficient Cd increases rapidly as the airspeeds approach the speed of sound. When the airspeeds are given in terms of Mach number M, drag divergence Mach number Mdd is defined as Mach number of a time when increment $\Delta$ Cd of drag coefficient Cd divided by increment $\Delta$ M of Mach number ($\Delta$ Cd/$\Delta$ M) becomes 0.1. Drag divergence Mach number Mdd depends on a blade aerofoil section, and it is said that the greater the value, the better the blade becomes because a higher airspeed of the blade can be achieved. It is common to set the airspeed of the tip of the advancing blade to around Mach 0.85.

On a retreating blade, on the other hand, since the airspeed thereof is significantly lowered, angle of attack $\alpha$ of the retreating blade must be greater in order to produce a lift similar to that of the advancing blade. For this purpose, it is common to carry out pitch control wherein a pitch angle of the retreating blade is controlled in accordance to azimuth angle $\Psi$. While the pitch angle of the blade is controlled as a sinewave function which has a minimum amplitude at $\Psi=90°$ and a maximum amplitude at $\Psi=270°$, angle of attack $\alpha$ of the blade in this case varies in the direction of span as shown in FIG. 6B due to flapping of the blade itself. For example, when the blade is at the position of $\Psi=90°$, the angle of attack $\alpha$ becomes about 0° at the root end and about 4° at the tip end. When $\Psi=270°$, the angle of attack $\alpha$ of the blade becomes about 0° at the root end and about 16° to 18° at the tip end, thus exceeding the stall angle of attack.

Characteristics used for evaluating a retreating blade include maximum lift coefficient Clmax and stall angle of attack, the maximum lift coefficient Clmax is defined as the maximum value of lift coefficient when the angle of attack $\alpha$ of a blade having a particular aerofoil section is gradually increased and reached the stall angle of attack. The blade is said to be better when the values of maximum lift coefficient Clmax and stall angle of attack are greater.

FIG. 7 is a graph showing an operating environment of helicopter rotor blades. The advancing blade at $\Psi=90°$ has a Mach number near the drag divergence Mach number Mdd and a lift coefficient Cl of about zero. The blade at $\Psi=0°$ and 180° is in a hovering state which is independent of the ground velocity V, while Mach number M is about 0.6 and lift coefficient Cl is about 0.6. The retreating blade at $\Psi=270°$ has a Mach number of 0.3 to 0.5 and a lift coefficient Cl near the maximum lift coefficient Clmax. As the blade makes a full revolution, Mach number and lift coefficient vary greatly by going around these states described above.

Hence a helicopter blade aerofoil is required 1) to have a large value of drag divergence Mach number Mdd, and 2) to have a large value of maximum lift coefficient Clmax, while a better flight performance of a helicopter is achieved when these values are greater.

The above description applies to an aerofoil of the tip side of a blade where the air speed is high. On the other hand, at the root end side of the blade where the air speed is not so high, greater emphasis is placed on maximum lift coefficient Clmax than on drag divergence Mach number Mdd. Further, a rotor blade of high efficiency with respect to lift or higher lift-drag ratio (lift/drag) is desired.

FIG. 8 is a graph explaining the lift-drag ratio (L/D) of a helicopter blade. This graph, plotting angles of attack (degrees) along the axis of abscissa, and the lift coefficient and drag coefficient along the axis of ordinate, shows changes of lift coefficient Cl and drag coefficient Cd versus angle of attack, when Mach number M is 0.6.

As a general aerodynamic phenomenon of aerofoil, lift and drag coefficients increase as the angle of attack increases. In a helicopter blade aerofoil, the higher the lift-drag ratio, the better the torque efficiency. Since the pitch angle of a blade changes periodically during rotation of the rotor, as described above, the lift-drag ratio calculated in such a manner is evaluated that a value of drag coefficient Cd in the case of Machnumber M=0.6 and lift coefficient Cl=0.6 is determined and Cl is divided by Cd.

Thus, at the tip side of the blade higher drag divergence Mach number Mdd and higher maximum lift coefficient Clmax are preferred, and at the root end side of the blade higher maximum lift coefficient Clmax is preferred, while higher lift-drag ratio (L/D) is preferred for the entire blade.

There are known as prior arts related to helicopter blade aerofoils, Japanese Unexamined Patent Publications JP-A 50-102099(1975), JP-A 59-134096(1984), and Japanese Examined Patent Publication JP-B2 62-34600(1987), for example.

Recently such attempts have been proposed that helicopters take off and land regularly by using roof top heliport of buildings or operate public area heliports, and for which it is required to minimize the noise of helicopters in flight.

FIG. 9 is a graph showing frequency spectra of noises generated by a helicopter. The noises of the helicopter are classified into several categories on the basis of origins of the noises, while harmonic components of the main rotor rotation frequency are distributed in a range from 10 to 100 Hz, harmonic components of the tail rotor rotation frequency are distributed in a range from 60 to 300 Hz, and broadband noise of the main rotor is distributed from 60 to 300 Hz. When the helicopter is flying at high speed, HSI (High-Speed Impulsive noise) is generated in a range from 60 to 300 Hz.

SUMMARY OF THE INVENTION

An objective of the invention is to provide a helicopter blade aerofoil having large values of maximum lift coefficient Clmax and lift-drag ratio and a reduced noise level.

The invention provides a helicopter blade aerofoil having coordinate values with ±3% errors of upper and lower surfaces, defined by a thickness to chord ratio within a range from 8% to 12% on the basis of a reference aerofoil having a thickness to chord ratio of 10% (hereinafter referred to as AK100C), of which upper and lower surfaces are substantially defined by the following coordinates and of which leading edge profile is substantially defined by the following leading edge radius and center of a circle:

| X/C | Yup/C | Ylow/C |
|---|---|---|
| 0.00000 | 0.00000 | 0.00000 |
| 0.00100 | 0.00604 | −0.00438 |
| 0.00250 | 0.00953 | −0.00691 |
| 0.00500 | 0.01349 | −0.00900 |
| 0.00750 | 0.01676 | −0.01027 |
| 0.01000 | 0.01962 | −0.01120 |
| 0.01750 | 0.02660 | −0.01308 |
| 0.02500 | 0.03207 | −0.01447 |
| 0.05000 | 0.04468 | −0.01740 |
| 0.07500 | 0.05284 | −0.01938 |
| 0.10000 | 0.05830 | −0.02086 |
| 0.15000 | 0.06430 | −0.02358 |
| 0.20000 | 0.06676 | −0.02631 |
| 0.25000 | 0.06762 | −0.02888 |
| 0.30000 | 0.06762 | −0.03101 |
| 0.35000 | 0.06715 | −0.03256 |
| 0.40000 | 0.06624 | −0.03350 |
| 0.45000 | 0.06456 | −0.03400 |
| 0.50000 | 0.06197 | −0.03392 |
| 0.55000 | 0.05849 | −0.03319 |
| 0.60000 | 0.05415 | −0.03179 |
| 0.65000 | 0.04895 | −0.02966 |
| 0.70000 | 0.04287 | −0.02670 |
| 0.75000 | 0.03598 | −0.02291 |
| 0.80000 | 0.02846 | −0.01841 |
| 0.85000 | 0.02057 | −0.01399 |
| 0.90000 | 0.01259 | −0.00802 |
| 0.95000 | 0.00527 | −0.00299 |
| 1.00000 | 0.00231 | −0.00094 |

Leading edge radius r/C=0.0159,

Center of circle X/C=0.0159, Y/C=0.0005, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

According to the invention, since the leading edge radius and the camber line are optimized in comparison with a conventional symmetric blade having a thickness to chord ratio of 10% (for example, NACA0010), pressure distribution over the upper surface of the airfoil is flattened and the noise level of the main rotor rotation can be reduced by several dB points from that of the prior art. Moreover, the maximum lift coefficient Clmax is greatly improved.

The aerofoil of the invention is, because of the emphasis placed on the improvement of maximum lift coefficient Clmax rather than on drag divergence Mach number Mdd, suited for an aerofoil at the root end side of a blade (for example, 0 to 90% of rotor radius R), and can provide an ideal helicopter blade when being combined with an aerofoil having a large drag divergence Mach number Mdd, for the tip side of the blade (for example, 90 to 100% of rotor radius R).

An aerofoil having a thickness to chord ratio of 8% (AK080C) is obtained by multiplying the values of Yup/C and Ylow/C by 8/10 for all chord lines X/C on the basis of the aerofoil having a thickness to chord ratio of 10% (AK100C), and on the other hand, an aerofoil having a thickness to chord ratio of 12% (AK120C) is obtained by multiplying the values by 12/10. Therefore, similar effect can be achieved with any aerofoil having a thickness ratio within a range from 8% to 12%, obtained by multiplying a constant factor for the reference aerofoil (AK100C).

The invention also provides a helicopter blade aerofoil having coordinate values with ±3% errors of upper and lower surfaces, defined by a thickness to chord ratio within a range from 8% to 12% on the basis of a reference aerofoil having a thickness to chord ratio of 10% (hereinafter referred to as AK100D), of which upper and lower surfaces are substantially defined by the following coordinates and of which leading edge profile is substantially defined by the following leading edge radius and center of a circle:

| X/C | Yup/C | Ylow/C |
|---|---|---|
| 0.00000 | 0.00000 | 0.00000 |
| 0.00100 | 0.00514 | −0.00575 |
| 0.00250 | 0.00862 | −0.00786 |
| 0.00500 | 0.01274 | −0.01020 |
| 0.00750 | 0.01615 | −0.01135 |
| 0.01000 | 0.01913 | −0.01218 |
| 0.01750 | 0.02639 | −0.01374 |
| 0.02500 | 0.03208 | −0.01484 |
| 0.05000 | 0.04525 | −0.01716 |
| 0.07500 | 0.05382 | −0.01862 |
| 0.10000 | 0.05954 | −0.01980 |
| 0.15000 | 0.06576 | −0.02207 |
| 0.20000 | 0.06822 | −0.02470 |
| 0.25000 | 0.06903 | −0.02729 |
| 0.30000 | 0.06895 | −0.02948 |
| 0.35000 | 0.06841 | −0.03110 |
| 0.40000 | 0.06744 | −0.03211 |
| 0.45000 | 0.06568 | −0.03270 |
| 0.50000 | 0.06301 | −0.03272 |
| 0.55000 | 0.05943 | −0.03211 |
| 0.60000 | 0.05498 | −0.03083 |
| 0.65000 | 0.04968 | −0.02883 |
| 0.70000 | 0.04349 | −0.02601 |
| 0.75000 | 0.03649 | −0.02235 |
| 0.80000 | 0.02886 | −0.01799 |
| 0.85000 | 0.02087 | −0.01309 |
| 0.90000 | 0.01279 | −0.00784 |
| 0.95000 | 0.00538 | −0.00291 |
| 1.00000 | 0.00236 | −0.00095 |

Leading edge radius r/C=0.0162

Center of circle X/C=0.0162, Y/C=−0.0006, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

According to the invention, because the leading edge radius and the camber line are optimized in comparison with a conventional symmetric blade having a thickness to chord ratio of 10% (for example, NACA0010), pressure distribution over the upper surface of the airfoil is flattened and the noise level of the main rotor rotation can be reduced by several dB points from that of the prior art. Moreover, the maximum lift coefficient Clmax is greatly improved.

The aerofoil of the invention is, because of the emphasis placed on the improvement of maximum lift coefficient Clmax rather than on drag divergence Mach number Mdd, suited for an aerofoil at the root end side of a blade (for example, 0 to 90% of rotor radius R), and can provide an ideal helicopter blade when combined with an aerofoil having a large drag divergence Mach number Mdd, for the tip side of the blade (for example, 90 to 100% of rotor radius R).

An aerofoil having a thickness to chord ratio of 8% (AK080D) is obtained by multiplying the values of Yup/C and Ylow/C by 8/10 for all chord lines X/C on the basis of the aerofoil having a thickness to chord ratio of 10% (AK100D), and on the other hand, an aerofoil having a thickness to chord ratio of 12% (AK120D) is obtained by multiplying the values by 12/10. Therefore, similar effect can be achieved with any aerofoil having a thickness ratio within a range from 8% to 12%, obtained by multiplying a constant factor for the reference aerofoil (AK100D).

BRIEF DESCRIPTION OF THE DRAWINGS

Other and further objects, features, and advantages of the invention will be more explicit from the following detailed description taken with reference to the drawings wherein:

FIGS. 6A and 6B show aerodynamic characteristics of a rotor of a helicopter in forward flight;

DETAILED DESCRIPTION OF THE PREFERRED EMBODIMENTS

Figure 1:
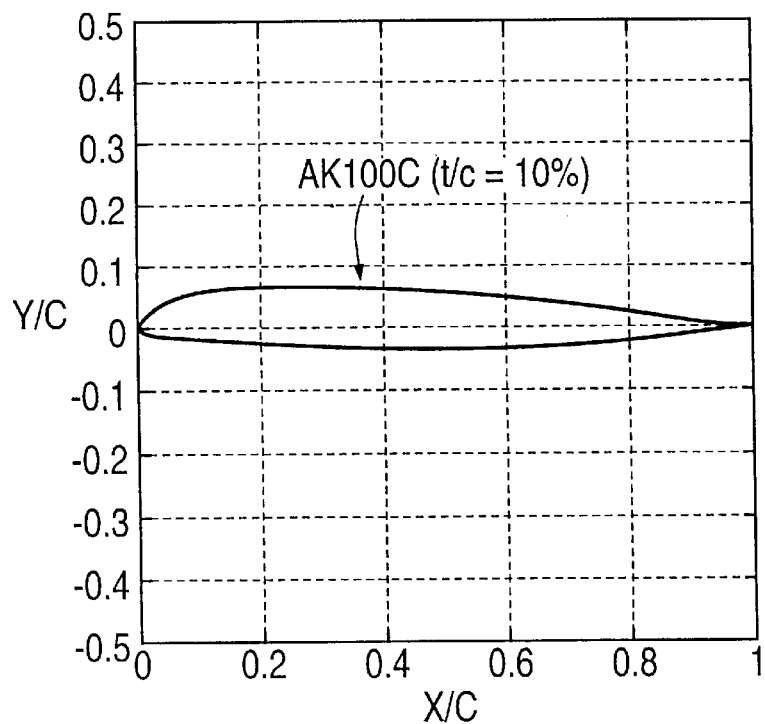
FIG. 1 is a graph showing an aerofoil configuration of AK100C according to a first embodiment of the invention.

Now referring to the drawings, preferred embodiments of the invention are described below.

Figure 2:
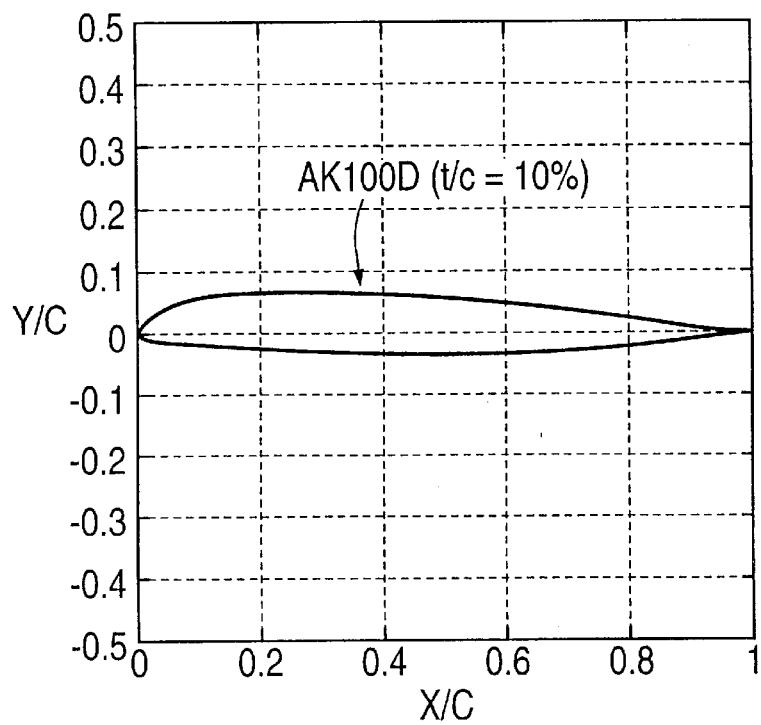
FIG. 2 is a graph showing an aerofoil configuration of AK100D according to a second embodiment of the invention.

FIG. 1 is a graph showing the aerofoil configuration of AK100C of a first embodiment of the invention, having a thickness to chord ratio of $t/c=10\%$. FIG. 2 is a graph showing the aerofoil configuration of AK100D of a second embodiment of the invention, having a thickness to chord ratio of $t/c=10\%$.

In the aerofoils AK100C and AK100D of the invention, the leading edge radius and camber line are optimized so that pressure distribution over the upper surface of the aerofoil is flattened with the peak pressure around the leading edge, in particular, being suppressed so that the entire pressure distribution is flattened, compared with a conventional symmetric aerofoil(NACA0010). Therefore the noise level of main rotor rotation can be reduced by several dB points over the prior art.

Moreover, since the aerofoils of the invention have the profile characteristics described previously (the leading edge radius and camber line are optimized), lift is increased, resulting in a great improvement in the maximum lift coefficient Clmax.

Wind tunnel tests for lift-drag ratio (L/D) proved that the aerofoils AK100C and AK100D of the invention have a high lift-drag ratio of 75, while the conventional helicopter blade aerofoils NACA0012 and NACA23012 have lift-drag ratios of around 50.

Figure 3:
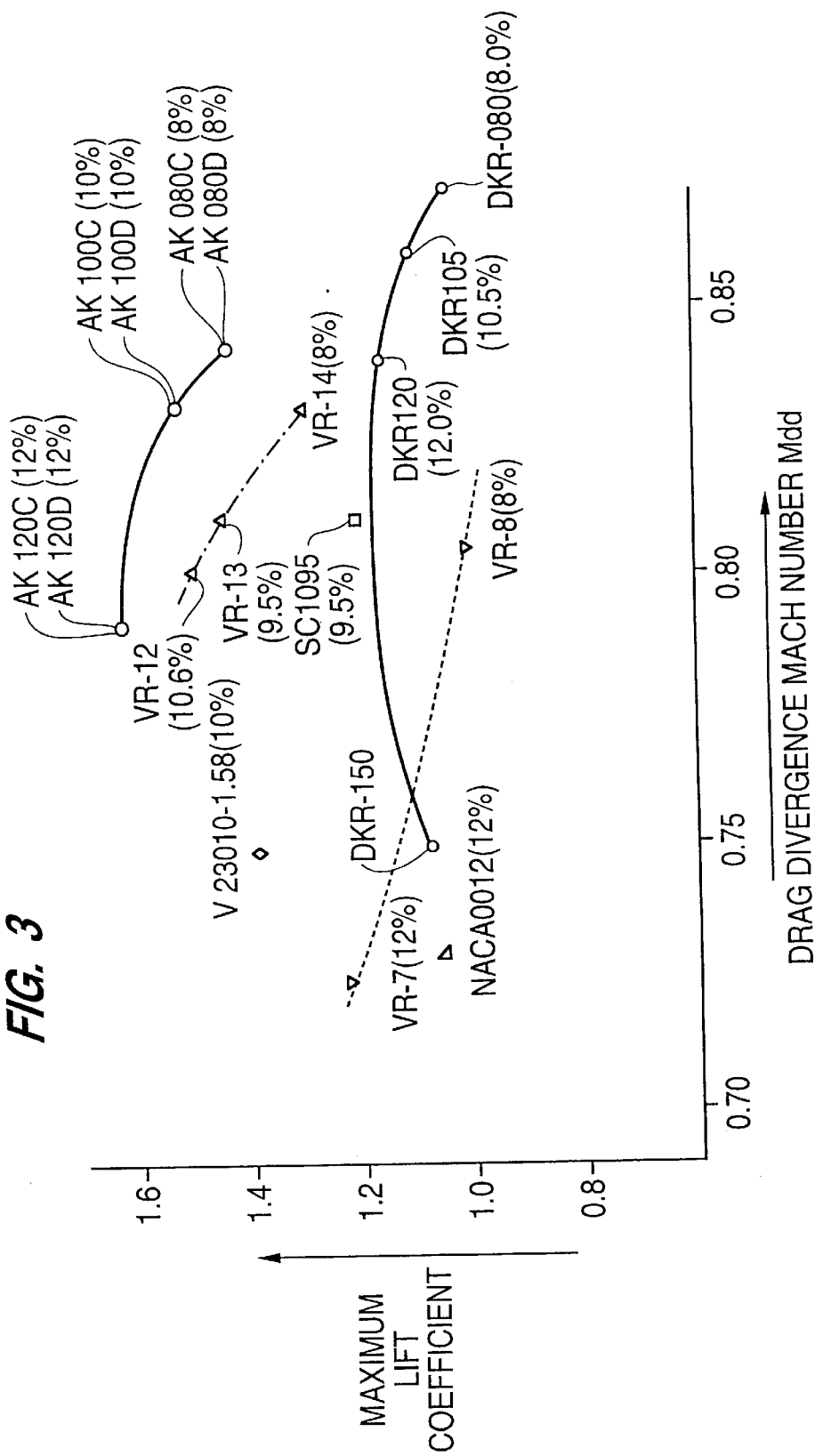
FIG. 3 is a graph showing results of comparing aerofoils of the invention and the prior art.

FIG. 3 is a graph showing results of comparing aerofoils of the invention and the prior art. This graph is drawn by using FIG. 3 of Japanese Unexamined Patent Publication JP-A 59-134096 (1984). Reference characters identifying different points in the graph are abbreviations of the names of the aerofoils, with numbers in parentheses showing the thickness to chord ratio (t/c). The aerofoils AK100C and AK100D of the invention having thickness to chord ratio of 10% give a drag divergence Mach number Mdd of approximately 0.83 and a maximum lift coefficient Clmax of approximately 1.5, showing great improvement particularly in maximum lift coefficient Clmax. Thus it can be seen that the aerofoils of the invention are best suited for aerofoils of root end side of a helicopter blade.

In the aerofoil AK080C and AK080D, which are obtained by changing the thickness to chord ratio to 8% on the basis of the aerofoils AK100C and AK100D, on the other hand, drag divergence Mach number Mdd is improved, while the aerofoils AK120C and AK120D of which thickness to chord ratios are changed to 12% have a improved maximum lift coefficient Clmax, indicating that the aerofoils having a thickness to chord ratio within a range from 8% to 12% have far better performance than the prior arts.

Figure 4:
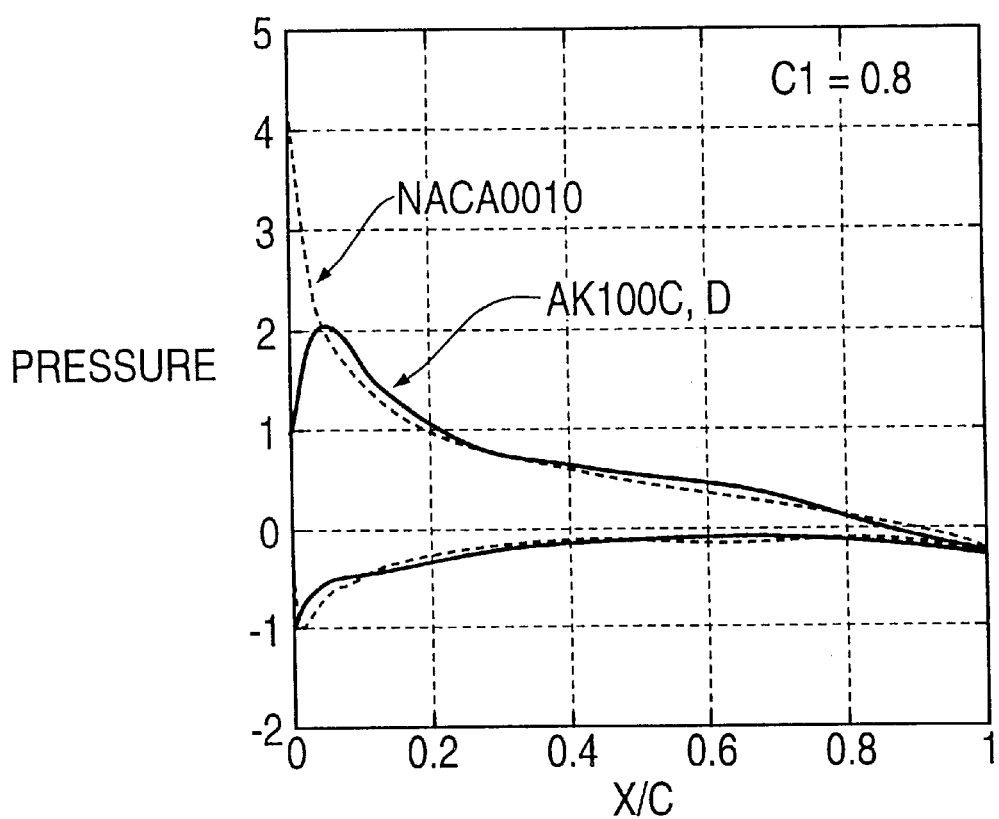
FIG. 4 is a graph showing results of comparison of pressure distribution of aerofoils.

FIG. 4 is a graph showing results of comparing a pressure distribution of aerofoils. The axis of abscissa shows a value X/C, which is obtained by normalizing a distance X from the leading edge toward the trailing edge along the chord line of the aerofoil, by a length C of the aerofoil in the chord direction, and the axis of ordinate shows pressures Cp (arbitrary unit) on the upper and lower surfaces of the aerofoil. The conventional aerofoil NACA0010 (dashed line) shows a sharp peak near the leading edge, and it is expected to generate large noise due to a sharp change in pressure. With the aerofoils AK100C and AK100D (solid line) of the invention, on the other hand, the peak near the leading edge is suppressed, and it is expected to lower also the noise level due to such suppression of change in pressure.

Figure 5A:
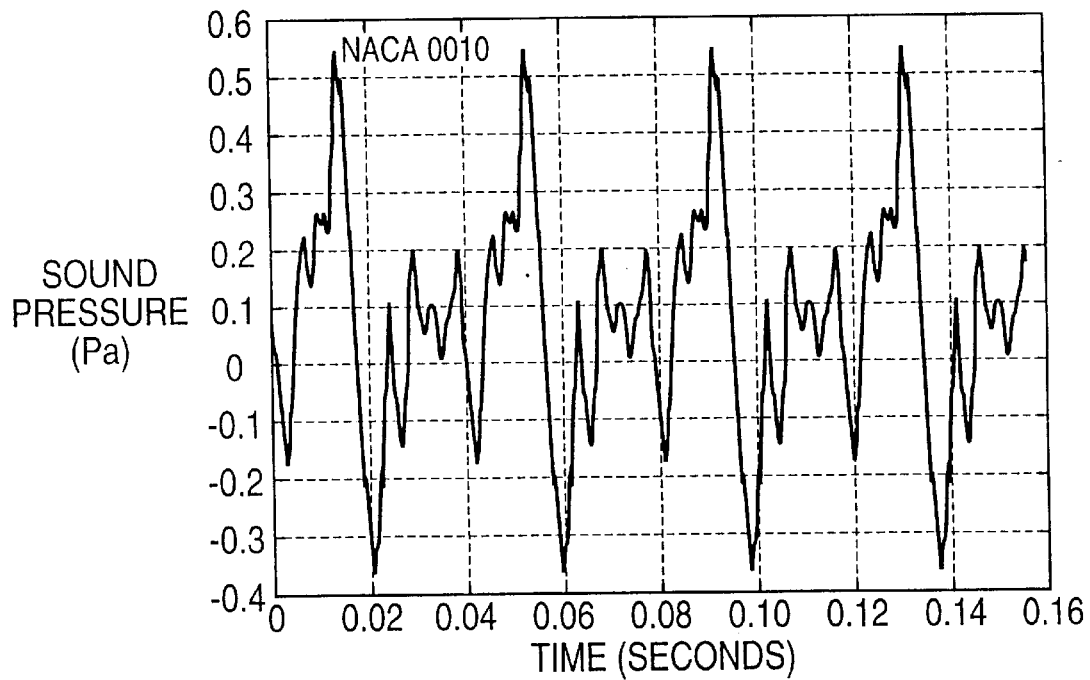
FIGS. 5A and 5B are graphs showing results of comparison of rotation noise generated by rotor blades.
Figure 5B:
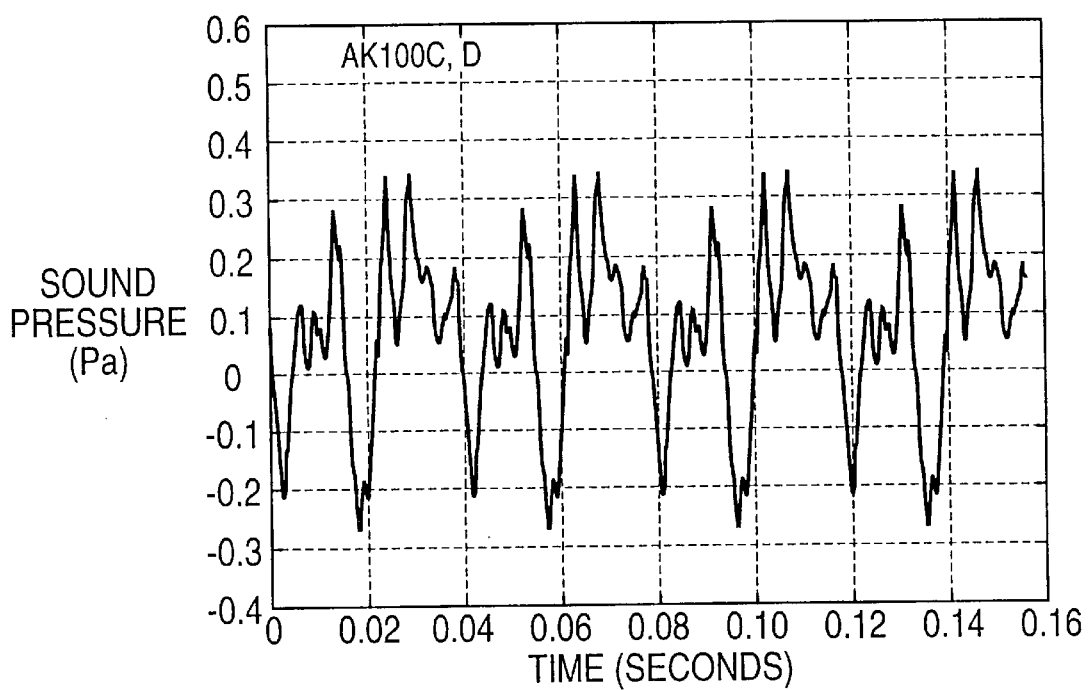
Figure 7:
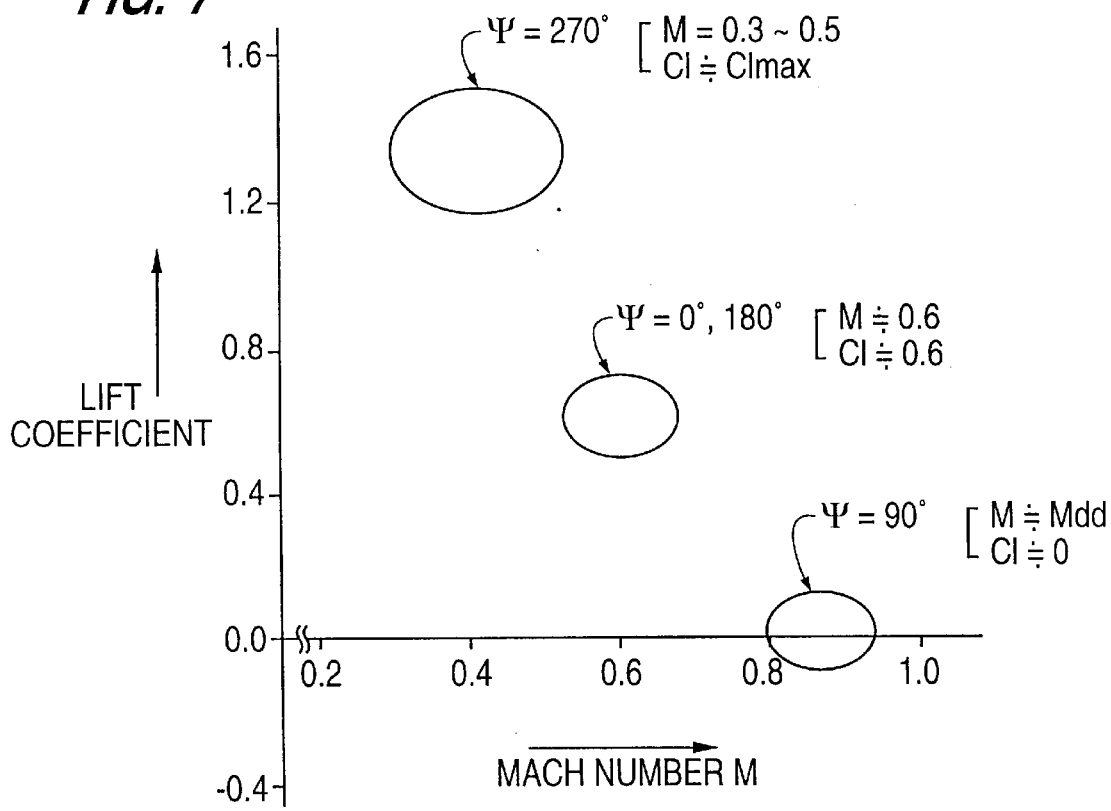
FIG. 7 is a graph showing an operating environment of a helicopter blade.
Figure 8:
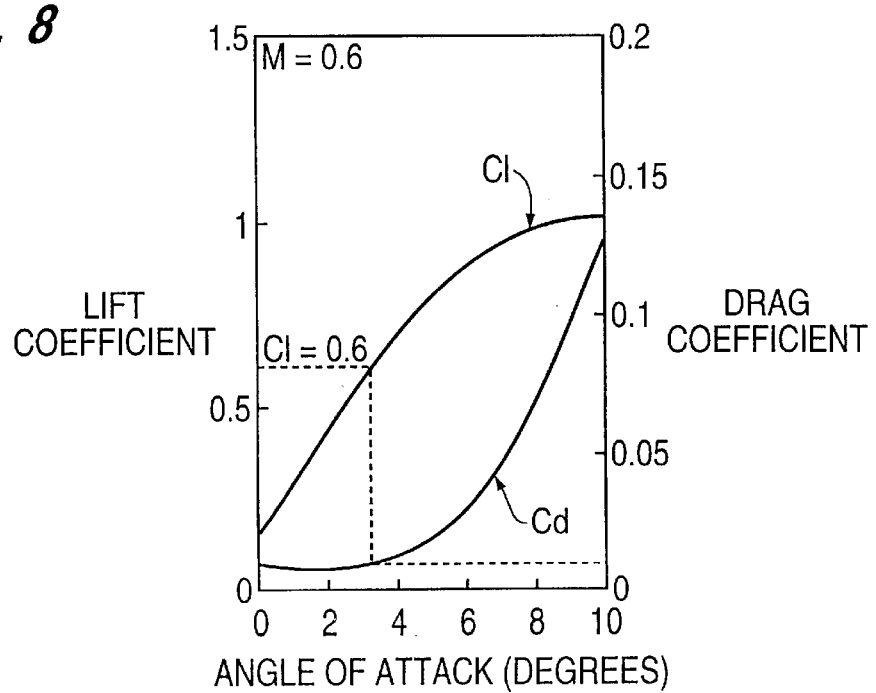
FIG. 8 is a graph explaining a lift-drag ratio (L/D) of a helicopter blade.
Figure 9:
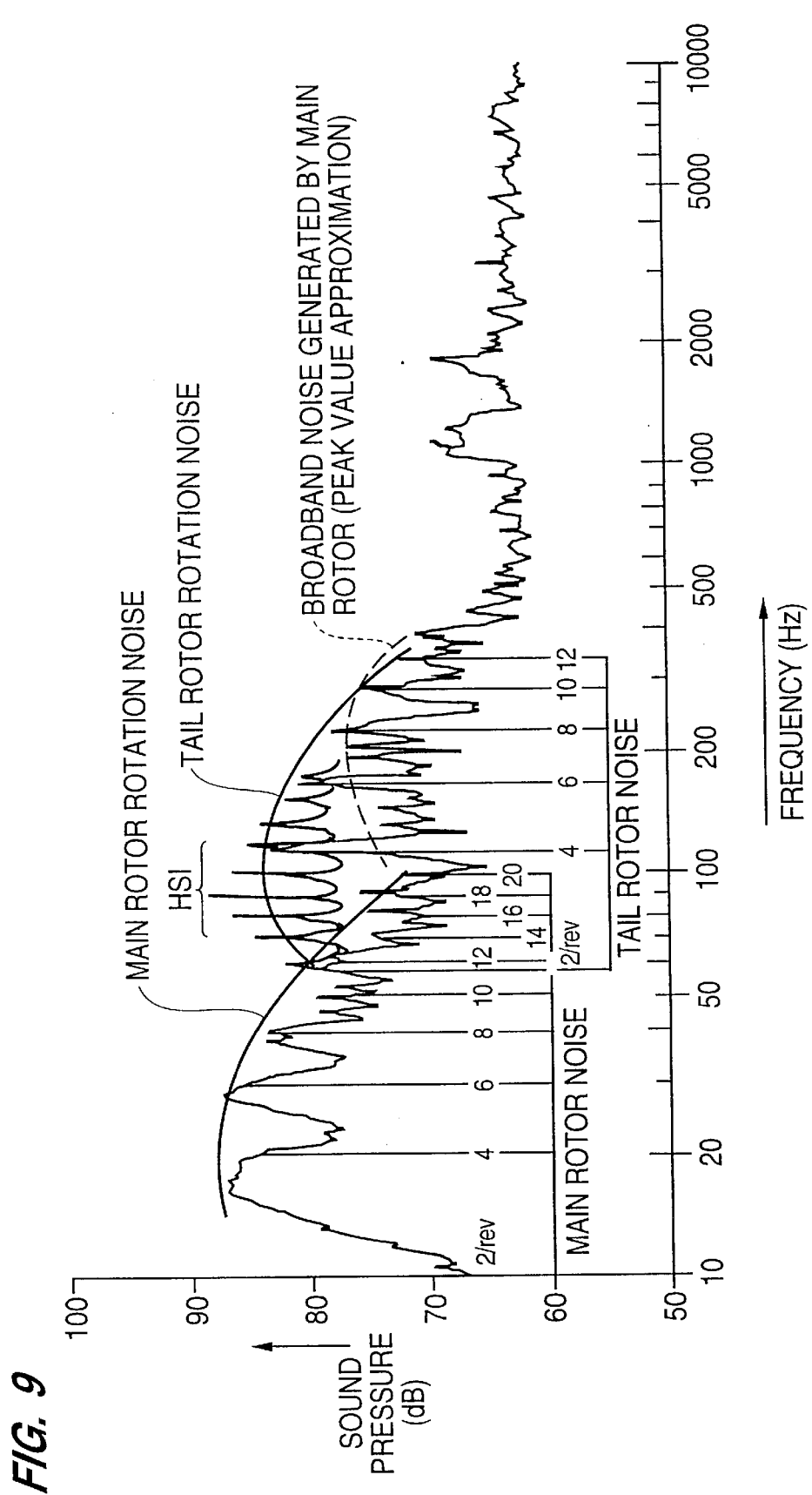
FIG. 9 is a graph showing frequency spectrums of noise generated by a helicopter.

FIGS. 5A and 5B are graphs showing results of comparing noise generated by rotor blades, FIG. 5A relating to the conventional aerofoil NACA0010, FIG. 5B relating to the aerofoils AK100C and AK100D of the invention. The axis of abscissa shows time lapsed, and the axis of ordinate shows the sound pressure level (unit; pascal) at a position at a specified distance from a rotation plane of the rotor. It can be seen that the sound pressure level changes periodically as the rotor rotates, with a period of rotation cycle of about 0.04 sec.

The graph shows that the conventional aerofoil shows a sharp peak of periodical variation which corresponds to the rotation cycle, while in the case of the aerofoil of the invention, significant periodical variations being suppressed, an amplitude of sound pressure is reduced to about a half, and the rotation noise is decreased by about several dB points.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A helicopter blade aerofoil having coordinate values with ±3% errors of upper and lower surfaces on the basis of a reference aerofoil having a thickness to chord ratio of 10%, of which upper and lower surfaces are substantially defined by the following coordinates and of which leading edge profile is substantially defined by the following leading edge radius and center of a circle:

| X/C | Yup/C | Ylow/C |
| --- | --- | --- |
| 0.00000 | 0.00000 | 0.00000 |
| 0.00100 | 0.00604 | −0.00438 |
| 0.00250 | 0.00953 | −0.00691 |
| 0.00500 | 0.01349 | −0.00900 |
| 0.00750 | 0.01676 | −0.01027 |
| 0.01000 | 0.01962 | −0.01120 |
| 0.01750 | 0.02660 | −0.01308 |
| 0.02500 | 0.03207 | −0.01447 |
| 0.05000 | 0.04468 | −0.01740 |
| 0.07500 | 0.05284 | −0.01938 |
| 0.10000 | 0.05830 | −0.02086 |
| 0.15000 | 0.06430 | −0.02358 |
| 0.20006 | 0.06676 | −0.02631 |
| 0.25000 | 0.06762 | −0.02888 |
| 0.30000 | 0.06762 | −0.03101 |
| 0.35000 | 0.06715 | −0.03256 |
| 0.40000 | 0.06624 | −0.03350 |
| 0.45000 | 0.06456 | −0.03400 |
| 0.50000 | 0.06197 | −0.03392 |
| 0.55000 | 0.05849 | −0.03319 |
| 0.60000 | 0.05415 | −0.03179 |
| 0.65000 | 0.04895 | −0.02966 |
| 0.70000 | 0.04287 | −0.02670 |
| 0.75000 | 0.03598 | −0.02291 |
| 0.80000 | 0.02846 | −0.01841 |
| 0.85000 | 0.02057 | −0.01399 |
| 0.90000 | 0.01259 | −0.00802 |
| 0.95000 | 0.00527 | −0.00299 |
| 1.00000 | 0.00231 | −0.00094 |

Leading edge radius r/C=0.0159,

Center of circle X/C=0.0159, Y/C=0.0005, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

2. A helicopter blade aerofoil having coordinate values with ±3% errors of upper and lower surfaces on the basis of an aerofoil having a thickness to chord ratio of 8% to 12% defined on the basis of the reference aerofoil of claim 1 having the thickness to chord ratio of 10%.

3. A helicopter blade aerofoil having coordinate values with ±3% errors of upper and lower surfaces on the basis of a reference aerofoil having a thickness to chord ratio of 10%, of which upper and lower surfaces are substantially defined by the following coordinates and of which leading edge profile is substantially defined by the following leading edge radius and center of a circle:

| X/C | Yup/C | Ylow/C |
| --- | --- | --- |
| 0.00000 | 0.00000 | 0.00000 |
| 0.00100 | 0.00514 | −0.00575 |
| 0.00250 | 0.00862 | −0.00786 |
| 0.00500 | 0.01274 | −0.01020 |
| 0.00750 | 0.01615 | −0.01135 |
| 0.01000 | 0.01913 | −0.01218 |
| 0.01750 | 0.02639 | −0.01374 |
| 0.02500 | 0.03208 | −0.01484 |
| 0.05000 | 0.04525 | −0.01716 |
| 0.07500 | 0.05382 | −0.01862 |
| 0.10000 | 0.05954 | −0.01980 |
| 0.15000 | 0.06576 | −0.02207 |
| 0.20000 | 0.06822 | −0.02470 |
| 0.25000 | 0.06903 | −0.02729 |
| 0.30000 | 0.06895 | −0.02948 |
| 0.35000 | 0.06841 | −0.03110 |
| 0.40000 | 0.06744 | −0.03211 |
| 0.45000 | 0.06568 | −0.03270 |
| 0.50000 | 0.06301 | −0.03272 |
| 0.55000 | 0.05943 | −0.03211 |
| 0.60000 | 0.05498 | −0.03083 |
| 0.65000 | 0.04968 | −0.02883 |
| 0.70000 | 0.04349 | −0.02601 |
| 0.75000 | 0.03649 | −0.02235 |
| 0.80000 | 0.02886 | −0.01799 |
| 0.85000 | 0.02087 | −0.01309 |
| 0.90000 | 0.01279 | −0.00784 |
| 0.95000 | 0.00538 | −0.00291 |
| 1.00000 | 0.00236 | −0.00095 |

Leading edge radius r/C=0.0162

Center of circle X/C=0.0162, Y/C=−0.0006, where X is a distance from the leading edge to a trailing edge along a chord line, C is a length of the aerofoil in the chord direction, Yup is a distance from the chord line to the upper surface, Ylow is a distance from the chord line to the lower surface, and r is the leading edge radius.

4. A helicopter blade aerofoil having coordinate values with ±3% errors of upper and lower surfaces on the basis of an aerofoil having a thickness to chord ratio of 8% to 12% defined on the basis of the reference aerofoil of claim 3 having the thickness to chord ratio of 10%.

* * * * *